(12) United States Patent
Schall et al.

(10) Patent No.: US 11,351,757 B2
(45) Date of Patent: Jun. 7, 2022

(54) COMPOSITE PANE AND METHOD FOR PRODUCING THE COMPOSITE PANE

(71) Applicant: SAINT-GOBAIN GLASS FRANCE, Courbevoie (FR)

(72) Inventors: Günther Schall, Kreuzau (DE); Stephan Gier, Bous (DE); Richard Brocker, Mönchengladbach (DE); Michael Balduin, Alsdorf (DE); Nikolai Borchmann, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 70 days.

(21) Appl. No.: 16/616,132

(22) PCT Filed: Dec. 13, 2017

(86) PCT No.: PCT/EP2017/082504
§ 371 (c)(1),
(2) Date: Nov. 22, 2019

(87) PCT Pub. No.: WO2018/215082
PCT Pub. Date: Nov. 29, 2018

(65) Prior Publication Data
US 2020/0156352 A1 May 21, 2020

(30) Foreign Application Priority Data
May 24, 2017 (EP) .................................. 17172622

(51) Int. Cl.
*B32B 17/10* (2006.01)

(52) U.S. Cl.
CPC .. *B32B 17/10587* (2013.01); *B32B 17/10036* (2013.01); *B32B 17/10761* (2013.01); *B32B 17/10899* (2013.01); *B32B 2605/006* (2013.01)

(58) Field of Classification Search
CPC ........ B32B 17/10587; B32B 17/10036; B32B 17/10761; B32B 17/10899; B32B 2605/006
See application file for complete search history.

(56) References Cited

U.S. PATENT DOCUMENTS 3,700,542 A * 10/1972 Davis ................ B32B 17/10889
428/174
5,589,272 A * 12/1996 Braun ............... B32B 17/10018
428/425.6

(Continued)

FOREIGN PATENT DOCUMENTS

CA    2 977 440 A1    10/2016
EP    2 674 295 A1    12/2013

(Continued)

OTHER PUBLICATIONS

Design Considerations for Laminated Glazing Applications, GANA, GANA LD 01-1003 (Year: 2008).*

(Continued)

*Primary Examiner* — Frank J Vineis
*Assistant Examiner* — Laura B Figg
(74) *Attorney, Agent, or Firm* — Pillsbury Winthrop Shaw Pittman LLP

(57) ABSTRACT

A composite pane includes a first pane, a second pane, and a thermoplastic film arranged between the two panes, wherein at least one pane is in the form of a flat glass and at least one pane surface has a plurality of elongated elevations and elongated depressions that extend along a first pane direction and are alternatingly arranged in a second pane direction perpendicular to the first pane direction, the thermoplastic film is produced by extrusion and at least one film surface has a plurality of elongated elevations and elongated depressions that extend along a first film direction and are alternatingly arranged in a second film (Continued)

Figure 1:
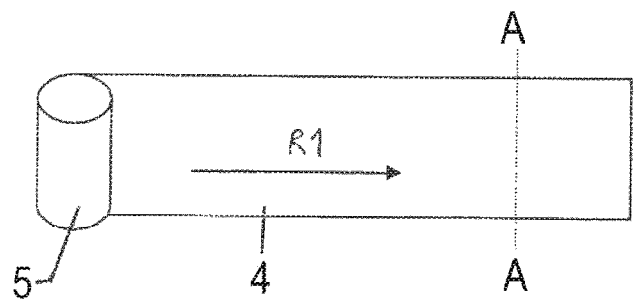

direction perpendicular to the first film direction, wherein the elongated elevations of the at least one pane are arranged at an angle different from 90° relative to the elongated elevations of the thermoplastic film.

12 Claims, 4 Drawing Sheets

(56) References Cited

U.S. PATENT DOCUMENTS 5,886,075 A * 3/1999 Keane ............... B29C 48/687
524/308
2013/0295358 A1  11/2013 Paulus et al.

FOREIGN PATENT DOCUMENTS

| | | |
|---|---|---|
| EP | 2 881 376 A1 | 6/2015 |
| EP | 3 029 000 A1 | 6/2016 |
| EP | 3 029 001 A1 | 6/2016 |
| EP | 3 029 002 A1 | 6/2016 |
| EP | 3 029 003 A1 | 6/2016 |
| EP | 3 029 440 A1 | 6/2016 |
| EP | 3 604 005 A1 | 2/2020 |
| JP | H05-147981 A | 6/1993 |
| JP | 2015-521575 A | 7/2015 |
| JP | 2015-196611 A | 11/2015 |
| JP | 2016-204249 A | 12/2016 |
| JP | 2017-062000 A | 3/2017 |
| JP | 2017-178675 A | 10/2017 |
| JP | 2018-162044 A | 10/2018 |
| RU | 2015106715 A | 9/2016 |
| WO | WO 95/19885 A1 | 7/1995 |
| WO | WO 2008/003789 A1 | 1/2008 |
| WO | WO 2015/016365 A | 2/2015 |
| WO | WO 2016/030284 A1 | 3/2016 |
| WO | WO-2016030284 A1 * | 3/2016 ........... B29C 48/002 |

OTHER PUBLICATIONS

International Search Report as issued in International Patent Application No. PCT/EP2017/082504, dated Feb. 16, 2018.

* cited by examiner

COMPOSITE PANE AND METHOD FOR PRODUCING THE COMPOSITE PANE

CROSS-REFERENCE TO RELATED APPLICATIONS

This application is the U.S. National Stage of PCT/EP2017/082504, filed Dec. 13, 2017, which in turn claims priority to European patent application number 17 172 622.7, filed May 24, 2017. The content of these applications are incorporated herein by reference in their entireties.

The invention relates to a composite pane and a method for producing the composite pane.

Composite panes, in particular those for use as a windshield of a motor vehicle, have two panes and at least one thermoplastic film situated between the two panes. Usually, at least one pane is in the form of flat glass, which is frequently produced in industrial series production in the float glass method.

In the float glass method, molten glass is routed from one side onto a bath of liquid tin (float bath). For example, the temperature at the inlet of the tin bath is approx. 1000° C. The lighter molten glass floats on the tin and spreads evenly on the tin surface. As result of the surface tension of the tin, the glass forms a very smooth surface. At a cooler end of the tin bath, the solidified glass is continuously pulled out in strip form and then cooled. After sufficient cooling, glass sheets are cut to length from the glass strip in the desired size.

The distribution of the molten glass on the tin bath determines an equilibrium thickness of the glass, which is, however, too large for many applications. In order to reduce the pane thickness, the already solidified glass is pulled out of the tin bath by actively driven (top) rollers, achieving elongation of the glass strip. Here, the thickness of the glass can be adjusted by the speed of the rollers, wherein a higher speed is set for producing thinner glasses and, correspondingly, a lower speed of the rollers is set for thicker glasses.

As is known to the person skilled in the art, the glass produced in the float glass method has a certain unevenness or waviness of its surfaces as a result of being pulled out of the tin bath. Accordingly, both glass surfaces have elongated elevations and depressions in a parallel arrangement, which extend in each case in the direction of the pulling of the glass strip from the tin bath. The elongated elevations and depressions correspond to wave crests and wave troughs that are arranged alternatingly and perpendicular to the pulling direction. These elongated structures of the glass are also known to the person skilled in the art as "float lines". The thinner the glass, the greater the pulling action on the glass strip has to be, resulting, in turn, in the fact that the float lines are more pronounced. In industrial series production of flat glass, rectangular glass sheets are typically cut to length with their longer dimension in the direction of the strip such that the float lines extend parallel to the longer dimension of the glass sheets.

Also known is the industrial production of thin glasses by the fusion draw method. Therein, the molten glass is typically withdrawn downward from the melting furnace via an outlet nozzle by rollers. In the fusion draw method, analogously to the float glass method, elongated elevations and depressions of the glass surfaces develop, corresponding to wave crests and troughs that are arranged alternatingly and perpendicular to the pulling direction such that, here as well, the glass surfaces have a slight waviness. These elongated structures of the thin glasses produced in the fusion draw method are known to the person skilled in the art as "draw lines".

The thermoplastic films that are produced by extrusion are also typically characterized by undesirable production-related waviness. This manifests itself in the form of thickness changes (elongated elevations and depressions) transverse to the direction of extrusion. This undesirable waviness must be distinguished from intentionally produced roughness, which is typically embossed into the thermoplastic film to promote deaeration of the layer stack during production of the composite pane. The unwanted waviness and the intentionally produced roughness differ substantially in terms of the distance between adjacent elongated elevations or elongated depressions. The intentionally produced roughness is described, for example, in EP 3 029 000 A1, EP 3 029 001 A1, EP 3 029 002 A1, EP 3 029 003 A1, EP 2 881 376 A1, EP 2 674 295 A1, WO 2016/030284 A1, WO 95/19885 A1, and WO 2008/003789 A1.

In practical application, the float lines or draw lines can result in an adverse effect on the optical properties of the flat glass since the waviness of the flat glass causes a lens effect with locally different optical refractive power. This is particularly pronounced when the float lines or draw lines unfavorably overlap with the production-related waviness of the thermoplastic film. For example, in the case of windshields in motor vehicles, when the head is inclined from one side to the other or from up to down, objects viewed through the windshield can appear distorted due to the locally different optical refractive power.

The object of the invention is to provide a composite pane with improved optical properties as well as a method for producing such a composite pane.

These and other objects are accomplished according to the proposal of the invention by a composite pane with the features of claim 1. Advantageous embodiments of the invention result from the dependent claims.

The present invention presents a composite pane, in particular a composite pane that comprises a first pane, a second pane, and at least one thermoplastic film arranged between the two panes. At least one of the two panes is in the form of a flat glass and has on at least one pane surface, in particular on both pane surfaces, a plurality of elongated elevations (wave crests) and elongated depressions (wave troughs) related to its production, which extend along a first (pane) direction and are arranged alternatingly in a second (pane) direction perpendicular to the first (pane) direction. The first direction usually corresponds to a pulling direction in the production of a glass strip from which the pane is formed, for example, the direction of pulling out of the float bath (tin bath) of a pane produced in the float method (the elevations or depressions correspond to the float lines) or the direction of pulling out of the melt strip of a thin glass produced in the fusion draw method (the elevations or depressions correspond to the draw lines). The elongated elevations and elongated depressions of the pane are typically parallel to one another and arranged in alternating sequence.

The thermoplastic film of the composite pane according to the invention is produced by an extrusion method, in which plasticized material is delivered in the form of a film from a extruder apparatus. The thermoplastic film also has a certain waviness or unevenness of the surface related to its production. Thus, at least one film surface, in particular both film surfaces, of the thermoplastic film has a plurality of elongated elevations (wave crests) and elongated depressions (wave troughs) that extend along a first (film) direction and are alternatingly arranged in a second (film) direction perpendicular to the first (film) direction. The first direction corresponds to the extrusion direction of the thermoplastic film. The elongated elevations and elongated depressions of the thermoplastic film are typically parallel to one another and arranged in alternating sequence.

In the context of the invention, the elongated elevations (wave crests) and depressions (wave troughs) of the thermoplastic film describe the production-related, actually undesirable surface waviness and are caused thereby. Typically, the distance between adjacent elevations or the distance between adjacent depressions is greater than or equal to 50 mm. This must be distinguished from a desired surface roughness that is often deliberately embossed into the film surface in the form of elongated elevations and depressions to promote deaeration during lamination of the composite pane, where the distance between adjacent elevations or depressions is typically less than 1 mm.

Essential to the present invention is the fact that the elongated elevations (and elongated depressions) at least of one pane made of flat glass are arranged at an angle different from 90° relative to the extrusion direction of the thermoplastic film, i.e., at an angle different from 90° relative to the elongated elevations (and elongated depressions) of the thermoplastic film. Advantageously, the elongated elevations are arranged at an angle from 0° to 45°, particularly preferably 0°, relative to the extrusion direction of the thermoplastic film.

As the inventors have perceived for the first time, flat glass panes adapt during lamination to the shape of the thermoplastic film and, thus, assume a certain waviness due to the waviness of the thermoplastic film. This effect occurs especially with very thin flat glass panes with thicknesses of less than 2.1 mm. As the inventors have found, an advantageous effect on the local lens effect of the pane can be achieved through the claimed relative arrangement at least of one pane having production-related waviness and the thermoplastic film. Without being bound by any theory, it is stated that by means of the waviness imposed on the pane by the thermoplastic film, a compensation or equalization of the production-related waviness of the pane can be achieved such that relatively large differences in the local optical refractive power are reduced. The optical properties of the pane are thus significantly improved; in particular, there are smaller distortions of objects in through-vision. For this purpose, the elongated elevations at least of one pane are advantageously arranged at an angle from 0° to 45° relative to the extrusion direction of the thermoplastic film, with the current assumption that the best effect in terms of a reduction of large differences in local optical refractive power can be achieved when the elongated elevations of a pane are arranged at an angle of 0° relative to the extrusion direction of the thermoplastic film.

The intended effect occurs especially with very thin panes, wherein it is preferred according to the invention for at least one pane with production-related elongated elevations and depressions to have a pane thickness of less than 2.1 mm. The inventors were able to demonstrate that with such thin panes, a particularly strong effect can be achieved in terms of a reduction in large differences in the local optical refractive power, since, on the one hand, the float lines or draw lines are stronger with thinner panes and, on the other, thin panes undergo a stronger change due to the waviness of the thermoplastic film during lamination. Particularly advantageously, at least one pane with production-related waviness has a pane thickness in the range from 0.5 mm to 1.1 mm. Such thin panes are advantageously produced in the fusion draw method. The inventors were able to demonstrate that for this pane thickness, the effect according to the invention (improvement of optical properties) is particularly strong.

In one advantageous embodiment of the invention, one pane with production-related waviness has a pane thickness of less than 2.1 mm and the other pane (which can also have production-related waviness) has a pane thickness in the range from 1.4 mm to 2.6 mm. If both panes are relatively thin, it can advantageously be achieved that the intended effect according to the invention occurs significantly with both panes. Alternatively, if one pane is thicker, it can advantageously be achieved that the effect according to the invention occurs significantly only for the thinner pane, while an improvement in the stability of the composite pane is achieved by means of the thicker pane.

In another advantageous embodiment of the invention, one pane with production-related waviness has a pane thickness of less than 2.1 mm and the other pane (which can also have production-related waviness) has a pane thickness of at least 2.1 mm, which is in particular within the range from 2.1 mm to 2.6 mm. Here, on the one hand, the advantageous effect of the invention occurs significantly with the thinner pane; on the other, a significant improvement in the stability of the composite pane results from the thicker pane.

According to the present invention, the first pane and/or the second pane can be provided with elongated elevations and depressions (wave structure) related to their production, with, for each pane, the above statements with reference to the relative arrangement of the elongated elevations or depressions of the pane and the thermoplastic film applying separately. In particular, in the case of two relatively thin panes (pane thickness less than 2.1 mm), a particularly good improvement of the optical properties of the composite pane can be achieved according to the invention.

The thermoplastic film contains at least one thermoplastic polymer, preferably ethylene vinyl acetate (EVA), polyvinyl butyral (PVB), or polyurethane (PU) or mixtures or copolymers or derivatives thereof, particularly preferably PVB. The thickness of the thermoplastic film is, for example, 0.2 mm to 2 mm and is, in particular, within the range from 0.3 mm to 1 mm.

The first and/or second pane with production-related waviness is a flat glass, in particular a float glass produced in the float glass method or a thin glass produced in the fusion draw method. It can, for example, be a quartz glass, borosilicate glass, aluminosilicate glass, or soda lime glass. Very thin glasses with thicknesses within the range from, for example, 0.5 mm to 1.1 are, in particular, produced in the fusion draw method.

In the installed state, composite panes of the windshield type usually have two pane edges extending in the vertical direction, which, for example, are adjacent the nearest body struts, e.g., A pillars, as well as two pane edges extending in the transverse direction, which are arranged, for example, on the roof side and on the engine compartment side. The production-related elongated elevations and elongated depressions of the at least one individual pane, in particular, both individual panes, typically run vertically. In the industrial series production of composite panes, the thermoplastic film necessary for lamination is typically rolled up along the extrusion direction and unrolled accordingly. According to one embodiment of the invention, the thermoplastic film is cut to length and laminated with the two individual panes such that the elongated elevations of the thermoplastic film are arranged parallel to the production-related elongated elevations of the composite pane and, consequently, extend in the vertical direction.

The invention further relates to a method for producing a composite pane according to the invention as described above. It comprises the following steps:
Providing the first pane,
Providing the second pane,
wobei at least one pane is in the form of a flat glass and has elongated elevations and elongated depressions on at least one surface,
Laminating the two panes with a thermoplastic film arranged between the two panes, wherein the thermoplastic film has elongated elevations and elongated depressions on at least one surface,
wherein the two panes and the thermoplastic film are arranged such that the elongated elevations of the at least one pane and the elongated elevations of the thermoplastic film are oriented at an angle different from 90°.

The invention further extends to the use of the composite pane according to the invention in means of transportation for travel on land, in the air, or on water, in particular in motor vehicles and in particular as a windshield in a motor vehicle.

The aforementioned embodiments and features of the invention can be provided alone or in any combinations.

Figure 2:
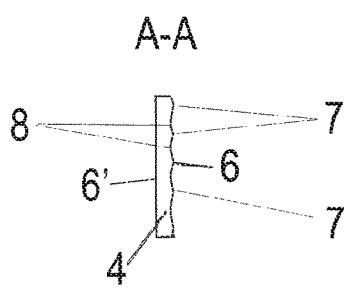
Figure 3:
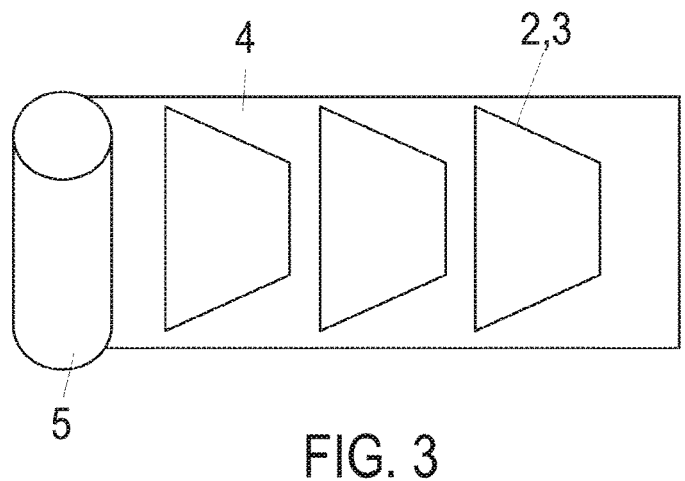
Figure 4:
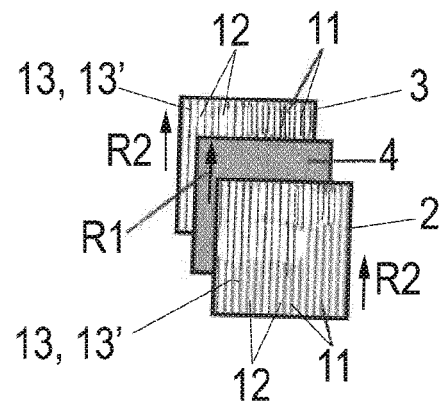
Figure 5:
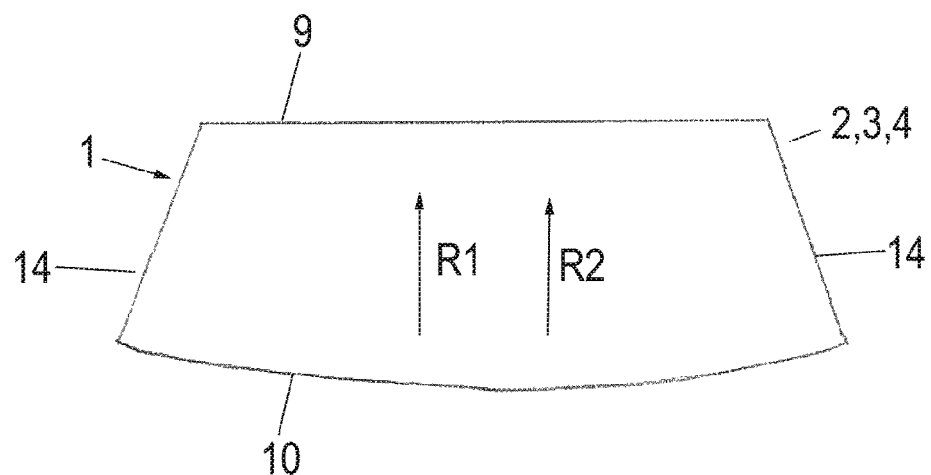
Figure 6:
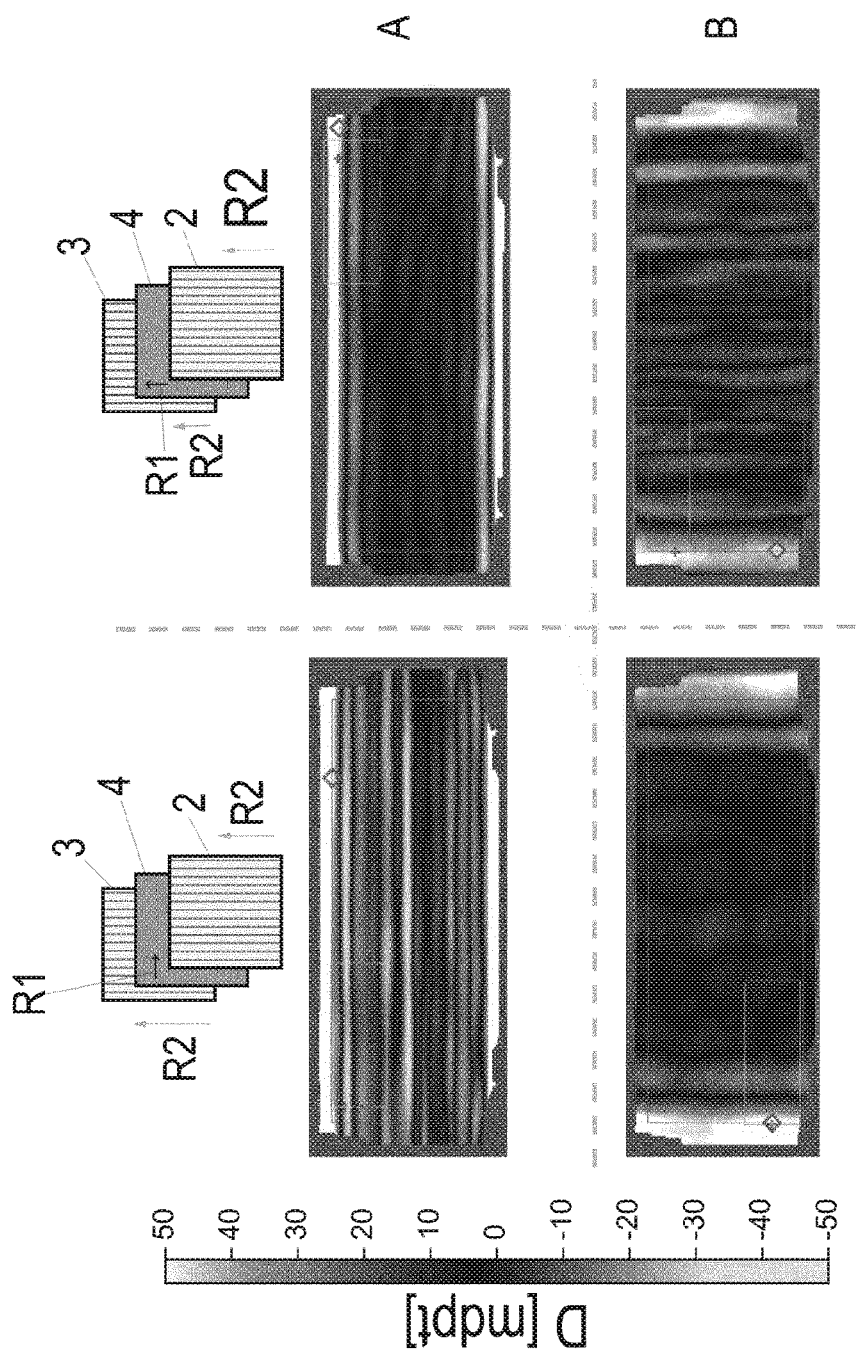
Figure 7:
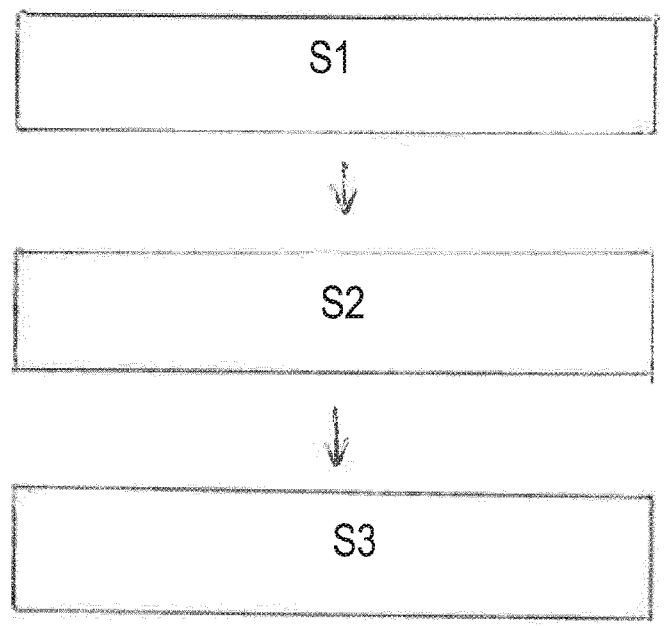

The invention is now explained in detail using exemplary embodiments with reference to the accompanying figures. They depict:

FIG. 1 a schematic representation of a thermoplastic film partially unwound from a roll;

FIG. 2 a cross-sectional view of the thermoplastic film along the section line A-A of FIG. 1;

FIG. 3 a schematic representation of the arrangement of individual panes for the cutting of the thermoplastic film of FIG. 1;

FIG. 4 an exploded representation of the composite pane according to a preferred embodiment of the invention;

FIG. 5 a composite pane, in particular a windshield of a motor vehicle, according to a preferred embodiment of the invention;

FIG. 6 a diagram illustrating the local optical refractive power of a prior art composite pane (left) and a composite pane according to the invention (right);

FIG. 7 a flowchart of a method for producing the composite pane according to the invention in accordance with a preferred embodiment of the invention.

FIG. 1 is a schematic representation of a thermoplastic film 4 partially unwound from a roll 5. The thermoplastic film 4 is preferably made of PVB. Alternatively, the thermoplastic film can be made of another suitable material, such as polyamide or polyethylene. The thermoplastic film 4 is produced by extrusion, with the extrusion direction of the thermoplastic film 4 corresponding to the winding or unwinding direction of the roll 5. In FIG. 1, the direction of extrusion or unwinding is indicated by the arrow R1.

FIG. 2 depicts a cross-sectional view of the thermoplastic film 4 along the section line A-A drawn in FIG. 1. At least one surface 6 of the thermoplastic film 4 is discernibly wavy and has, in parallel arrangement, a plurality of elongated elevations 7 projecting from the surface 6 (hereinafter referred to as film elevations 7) and elongated depressions 8 deepening the surface 6 (hereinafter referred to as film depressions 8). The film elevations 7 and film depressions 8 extend in each case in the extrusion direction R1. Transverse to the extrusion direction, the film elevations 7 and film depressions 8 are alternatingly arranged. The film elevations 7 and film depressions 8 are wave-shaped such that the surface 6 of the thermoplastic film has a waviness. It should be noted that FIG. 2 is only a schematic representation; typically, the opposite surface 6' is correspondingly wavy and provided with film elevations 7 and film depressions 8.

FIG. 3 is a schematic representation to illustrate a preferred embodiment of (individual) panes 2, 3 relative to the thermoplastic film 4 for producing a composite pane according to the invention 1. Accordingly, the thermoplastic film 4 is cut to length such that the pane edges extending, in the installed state, in the transverse direction of the vehicle are arranged transversely to the extrusion direction R1.

FIG. 4 is an exploded representation of the composite pane 1 in accordance with a preferred embodiment of the invention. The composite pane 1 comprises a first pane 2 and a second pane 3, as well as, between the two panes 2, 3, a thermoplastic film 4, which is cut to length from the roll 5. Each pane 2, 3 has, related to its production, a plurality of elongated elevations 11 projecting from the surface 13 (hereinafter referred to as pane elevation 11) and elongated depressions 12 deepening the surface 13 (hereinafter referred to as pane depression 12) in parallel arrangement. The pane elevations 11 and pane depressions 12 extend in each case along a direction that is indicated in FIG. 4 by the arrow R2. The pane elevations 11 and pane depressions 12 are alternatingly arranged transverse to the direction R2. The pane elevations 11 and pane depressions 12 are wave-shaped such that the surface 13 of each of the two panes 2, 3 has a waviness. Typically, both opposite surfaces 13, 13' of each pane 2, 3 are wave-shaped and have pane elevations 11 and pane depressions 12.

As illustrated in FIG. 4, in the laminated state, the pane elevations 11 and pane depressions 12 of the first pane 2 are arranged parallel to the pane elevations 11 and pane depressions 12 of the second pane 3. In addition, the pane elevations 11 and pane depressions 12 of the two panes 2, 3 are arranged parallel to the extrusion direction R1 or parallel to the film elevations 7 and film depressions 8.

Furthermore, the first pane 2 is thinner than 2.1 mm. The pane thickness of the second pane 3 is within the range from 0.5 mm to 1.1 mm. Alternatively, provision can be made for the pane thickness of the second pane 3 to be greater than 2.1 mm and in particular within the range from 2.1 mm to 2.6 mm. The first pane 2 and second pane 3 are made of glass and are, for example, produced in the float glass method or a fusion draw method. It is also conceivable for only the first pane 2 to be made of glass and have pane elevations 11 and pane depressions 12, and for the second pane 3 to be made of a polymer.

FIG. 5 depicts another embodiment of the composite pane according to the invention 1, in particular for use as a windshield of a motor vehicle. As illustrated in FIG. 5, the composite pane 1 comprises a first pane 2, a second pane 3, and a thermoplastic film 4. The composite pane 1 has four pane edges, namely an upper pane edge 9 and a lower pane edge 10, which extend, in the installed state, in the (vehicle's) transverse direction, and two side pane edges 14, which extend, in the installed state, in the (vehicle's) vertical direction. The film elevations 7 and film depressions 8 extend in each case along a shortest connection line between the upper pane edge 9 and the lower pane edge 10 (i.e., extrusion direction R1). The first and/or second pane 2, 3 is flat glass and has pane elevations 11 and pane depressions 12, which also extend along a shortest connection line between the upper pane edge 9 and the lower pane edge 10 (i.e., pulling direction R2).

FIG. 6 depicts a diagram in which the optical refractive power D of a prior art composite pane (left) and a composite pane according to the invention 1 (right) is indicated. The first pane 2 is a 0.5-mm-thick aluminosilicate glass that is produced in the fusion draw method; the second pane 3 is a 2.1-mm-thick soda lime glass that is produced in the float glass method.

In the two images on the left, which correspond to the prior art case, the extrusion direction R1 of the thermoplastic film 4 is oriented at an angle of 90° relative to the direction R2 of the pane elevations 11 and pane depressions 12 of the two panes 2, 3. In the two images on the right, which correspond to the invention, the extrusion direction R1 of the thermoplastic film 4 is oriented at an angle of 0° relative to the direction R2 of the pane elevations 11 and pane depressions 12 of the two panes 2, 3, in other words, the extrusion direction R1 and the direction R2 are parallel to each other.

In the diagram, the optical refractive power D [mdpt] in through-vision through the composite panes is illustrated using different shades of gray. The two upper images report the horizontal optics (i.e., the change in the optical refractive power in the horizontal direction) (Case A). The two lower images report the vertical optics (i.e., the change in the optical refractive power in the vertical direction) (Case B).

As is readily discernible from the two upper images (Case A), a significant reduction in the changes of the optical refractive power D can be achieved, especially in the interior region, with the composite pane according to the invention (right image). Compared to the prior art case, the optical refractive power D of the composite pane is substantially more homogeneous such that the through-vision is improved. With regard to the vertical optics (Case B, lower images), a slight worsening appears to occur with the invention (amplification of the changes in the optical refractive power D); however, this is hardly noticeable in practice since the changes in the optical refractive power D in the vertical direction are typically far less distracting than changes in the optical refractive power in the horizontal direction. Thus, by means of the composite pane according to the invention, a significant improvement of the optical properties in through-vision is achieved.

FIG. 7 depicts a flowchart of a method for producing the composite pane according to a preferred embodiment of the invention.

The method comprises providing (S1) the first pane 2, providing (S2) the second pane 3, and laminating (S3) the two panes 2, 3 with a thermoplastic film 4 arranged between the two panes, wherein the two panes 2, 3 and the thermoplastic film 4 are arranged such that the production-related pane elevations 11 and pane depressions 12 of the first pane 2 and/or the second pane 3 are oriented at an angle different from 90°, in particular at an angle from 0° to 45°, preferably 0°, relative to the extrusion direction of the thermoplastic film 4.

From the statements above, it can be seen that the invention provides a composite pane with significantly reduced local changes in the optical refractive power and, consequently, improved through-vision. Prior art methods for producing composite panes can easily be modified to achieve economical production of the composite pane.

LIST OF REFERENCE CHARACTERS 1 composite pane
2 first pane
3 second pane
4 thermoplastic film
5 roll
6, 6' film surface
7 film elevation
8 film depression
9 upper pane edge
10 lower pane edge
11 pane elevation
12 pane depression
13, 13' pane surface
14 side edge of the pane

The invention claimed is:

1. Composite pane comprising a first pane, a second pane, and at least one thermoplastic film arranged between the first and second panes, the composite pane further comprising two opposite pane edges extending in a transverse direction in an installed state and two opposite pane edges extending in a vertical direction in the installed state, wherein
at least one pane of the first and second panes is in the form of a flat glass and at least one pane surface has a plurality of elongated elevations and elongated depressions that extend along a first pane direction and are alternatingly arranged in a second pane direction perpendicular to the first pane direction,
the thermoplastic film is produced by extrusion and at least one film surface has a plurality of elongated elevations and elongated depressions that extend along a first film direction and are alternatingly arranged in a second film direction perpendicular to the first film direction,
wherein the first pane and second pane each have elongated elevations and elongated depressions and wherein the elongated elevations and elongated depressions of the first pane are arranged parallel relative to the elongated elevations and elongated depressions of the second pane,
wherein the elongated elevations of the first pane and the second pane each are arranged at an angle of 0° relative to the elongated elevations of the thermoplastic film, and
wherein the elongated elevations and elongated depressions of the first pane and the second pane extend along a line, wherein the line is the shortest line that connects the two opposite pane edges extending in the transverse direction to one another.

2. The composite pane according to claim 1, wherein a distance between adjacent elevations and a distance between adjacent depressions of the thermoplastic film are greater than or equal to 50 mm.

3. The composite pane according to claim 1, wherein the at least one pane that is in the form of a flat glass is produced in the float glass method or the fusion draw method.

4. The composite pane according to claim 1, wherein the thermoplastic film is made of polyvinyl butyral (PVB).

5. The composite pane according to claim 1, wherein the at least one pane that is in the form of a flat glass has a pane thickness of less than 2.1 mm.

6. The composite pane according to claim 5, wherein the at least one pane that is in the form of a flat glass has a pane thickness in the range from 0.5 mm to 1.1 mm.

7. The composite pane according to claim 5, wherein the at least one pane that is in the form of a flat glass has a pane thickness of less than 2.1 mm, and the other pane has a pane thickness in the range from 1.4 mm to 2.6 mm.

8. The composite pane according to claim 5, wherein the at least one pane that is in the form of a flat glass has a pane thickness of less than 2.1 mm, and the other pane has a pane thickness of at least 2.1 mm.

9. The composite pane according to claim 8, wherein the other pane has a pane thickness in the range from 2.1 mm to 2.6 mm.

10. Method for producing a composite pane according to claim 1, the method comprising:
- providing the first pane,
- providing the second pane,
- laminating the first and second panes with at least one thermoplastic film arranged between the first and second panes,
- wherein the first and second panes and the thermoplastic film are arranged such that the elongated elevations at least of one pane of the first and second panes are arranged at an angle different from 90° relative to the elongated elevations of the thermoplastic film.

11. A method comprising utilizing a composite pane according to claim 1 in means of transportation for travel on land, in the air, or on water.

12. The method according to claim 11, wherein the composite pane is a windshield in a motor vehicle.

* * * * *